Patented May 5, 1942

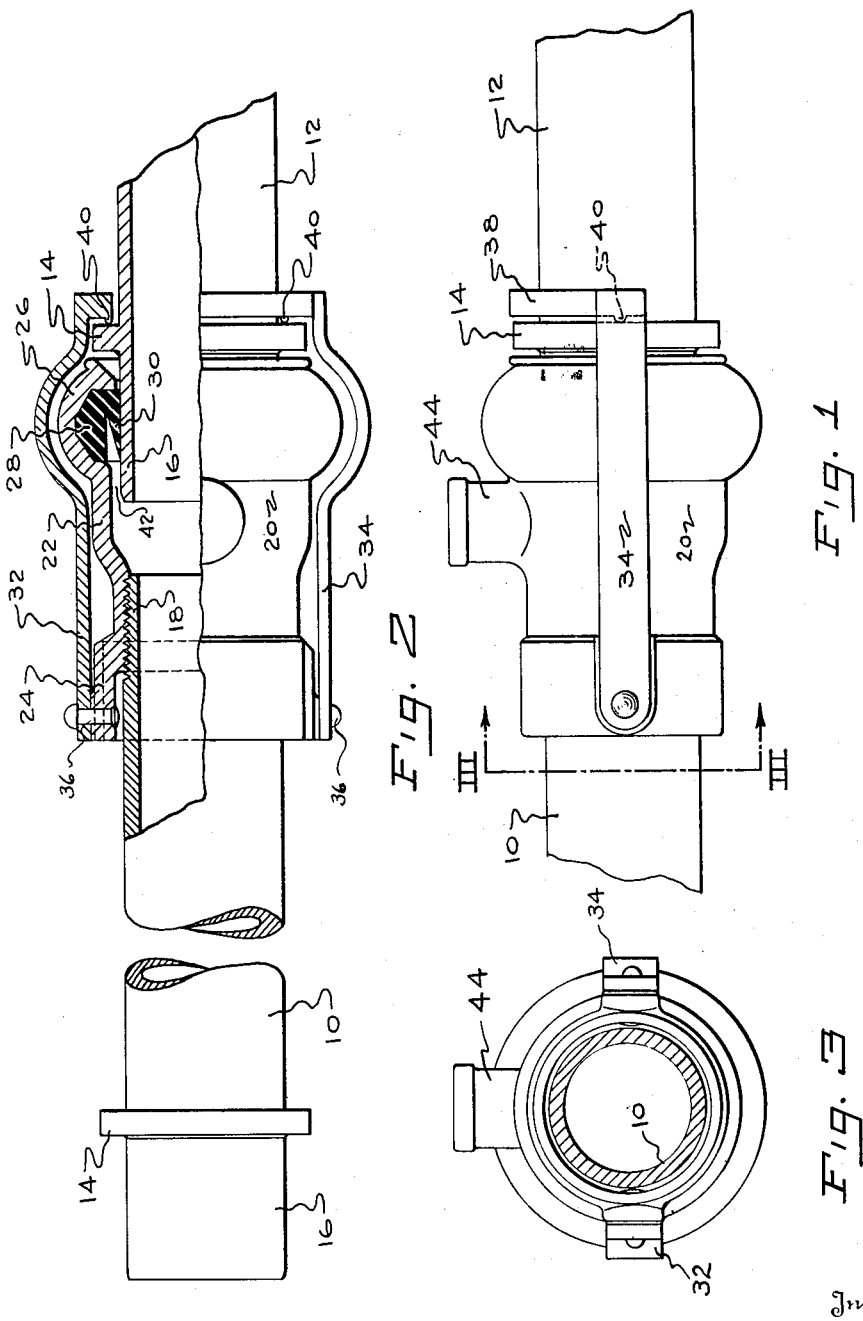

2,281,633

UNITED STATES PATENT OFFICE 2,281,633

PIPE AND COUPLING

William E. Stitzer, Muskogee, Okla., assignor to Latch Coupling Company, Muskogee, Okla., a corporation of Oklahoma Application January 15, 1940, Serial No. 313,811

1 Claim. (Cl. 285—170)

The present invention relates to improvements in pipe coupling being a further development of the coupling shown in my Patent No. 2,083,966, granted June 15, 1937.

As in the aforesaid patent, the coupling of the present invention is particularly desired for use in connection with water pipe lines for irrigation and construction work where it is desirable that the pipe line be quickly laid and connected with unskilled labor if necessary. It differs from my patented coupling, however, in that a horseshoe type of latch is used with the latch and packing gland associated in a unitary structure capable of being attached to any standard pipe section. The adoption of the coupling to any standard pipe section for connection to similar sections requiring only a threading operation at one end and the provision, by welding or otherwise, of a ring or its equivalent to the opposite plain end of the section.

Thus one of the objects of the present invention is to provide an improved combined latch and packing gland coupling unit for standard pipe section.

Another object is to provide a coupling having as a unitary structure a packing gland and a horseshoe type latch adapted to be threaded or otherwise secured to one end of a standard pipe section.

A further object is to provide an improved coupling for pipe section capable of withstanding relatively high pressure which is simple in its application to standard pipe sections and suitable for use where temporary pipe lines quickly laid upon the ground are desired.

A still further object is to provide as a new article of manuacture an improved coupling unit adapted to be rigidly secured at one end to one end of a standard pipe section and have a flexible pressure sealed connection at the opposite end with a similar pipe section.

These and other objects and advantages residing in the combination, arrangement and construction of parts having reference to flexibility of the coupling, application and fabrication will hereinafter appear.

In the drawing,

Fig. 1 is a side elevational view of the coupling as applied to opposed ends of the pipe sections, Fig. 2 is a plan view of Fig. 1, partially shown in broken section, and Fig. 3 is a cross-sectional view taken on line III—III of Fig. 1.

Referring to the drawing, standard pipe sections 10 and 12 have, welded or otherwise secured thereto, rings 14 inwardly from the plain ends 16 of the pipe sections. The opposite ends of each pipe section is threaded at 18 to be screwed within the coupling unit generally designated by reference character 20.

The coupling unit 20 comprises a cast or otherwise fabricated main body portion 22 having a skirt portion 24 at one end and an annular chamber 26 at the other end to receive the packing gasket 28. In practice the gasket 28 is of rubber with a lip portion 30 which under the influence of fluid pressures within the coupling 26 is forced against the outside of the plain end 16 of the pipe section to form a fluid seal.

A horseshoe type latch having arm portions 32 and 34, pivoted to the opposite sides of the skirt 24 by rivets 36, connected by a semi-circular portion 38, is provided as a unitary part of the coupling unit 20. Bosses 40 on each side of the horseshoe portion of the latch having bearing upon diametrical opposed portions of the ring 14. This arrangement and the provision of clearance at 42 provides the necessary amount of flexibility to the coupling as should be readily apparent. A lateral connection 44 is shown as an integral part of the body 22. This is optional, however, and may be omitted.

The use of the coupling is as follows: Standard pipe sections are selected and one end threaded as at 18 while the ring 14 is welded to the plain end 16 inwardly from the end. The coupling unit 20 is then screwed upon the threaded end 18. The pipe section 10 with coupling attached is ready to be quickly coupled to any similar pipe section 12. To couple the sections 10 and 12 the plain end 16 is merely inserted into one end of the unit 20. The plain end 16 will snugly fit within the packing 28 which is so constructed and located as to stay in position when the pipe end is inserted. At the time the pipe end is inserted the latch is raised to clear the ring 14. The latch is then lowered into the position shown holding the pipe section against endwise movement when fluid pressure is applied. The bosses 40 take their endwise thrust at diametrical opposed points on the ring 14. This arrangement enables the pipe sections to rock about the bosses 40 within the limits of the clearance of the end 16 within the coupling unit. Fluid pressure acting inwardly upon the lip 30 of the packing 28 will seal the coupling in any angular position of the pipe sections within the limits of the flexibility provided as more fully described in United States Patent No. 2,049,801, granted August 4, 1936.

With extremely thin wall pipes which will not permit threading, the coupling unit 20 may be welded upon the end of the pipe section in lieu of being threaded thereon as herein disclosed.

Having thus described my invention, what I desire to secure by Letters Patent and claim is:

A coupling comprising male and female parts having their terminal portions in substantial telescoping relation, a seal carried by said female part and spaced inwardly from its end and embracing said male part at a point spaced inwardly from its end, said female part being enlarged beyond said seal to provide clearance for the end of said male part in all positions of permitted angular adjustment between said parts, an annular shoulder defined by the outer surface of the terminal portion of said female part and spaced outwardly from said seal, an annular exterior flange upon said male part spaced inwardly from that portion embraced by said seal and in axial alignment with said shoulder upon said female part and engageable therewith to limit the telescoping relation of said parts, said telescoping terminal portions being loosely fitted to permit angular adjustment between said parts, a swinging latch pivoted at one end to said female part and having clearance with said flange on said male part, with the latter directly adjacent said shoulder to enable the latch to be swung into position back of said flange to prevent separating movement of said parts, said latch being so proportioned and positioned behind said flange as to confine said flange sufficiently adjacent said shoulder as to limit the angular movement of said parts through engagement of said flange between said latch and said shoulder, whereby binding action between the terminal portions of said parts is avoided upon angular adjustment of said parts.

WILLIAM E. STITZER.